United States Patent [19]

Perny

[11] Patent Number: 4,642,801
[45] Date of Patent: Feb. 10, 1987

[54] VISUAL DISPLAY PROCESS FOR SONARS

[75] Inventor: Didier Perny, Brest, France

[73] Assignee: Thomson-CSF, Paris, France

[21] Appl. No.: 597,861

[22] Filed: Apr. 9, 1984

[30] Foreign Application Priority Data

Apr. 12, 1983 [FR] France ................. 83 05938

[51] Int. Cl.$^4$ ............................................. G01S 7/56
[52] U.S. Cl. .......................................... 367/88; 367/7; 367/113
[58] Field of Search ........................... 367/88, 113, 7

[56] References Cited

U.S. PATENT DOCUMENTS

| 3,154,779 | 3/1967 | Kenny | 343/11 R |
| 3,309,702 | 3/1967 | Saxton | 164/316 |
| 4,030,096 | 6/1977 | Stevens et al. | 343/51 CM |
| 4,207,620 | 6/1980 | Morgera | 367/88 |

FOREIGN PATENT DOCUMENTS 2080534 2/1982 United Kingdom .

OTHER PUBLICATIONS

Shishido and Naito, "A Study on Picture Improvement for Side Looking Sonar-Part 1", *NEC Research & Development*, No. 53, Apr. 1979, pp. 62-74.

Primary Examiner—Thomas H. Tarcza
Assistant Examiner—Daniel T. Pihulic
Attorney, Agent, or Firm—Pollock, VandeSande & Priddy

[57] ABSTRACT

A visual display process of objects identified by a classification sonar consisting of modifying the visual display cathode ray tube scan laws in order to obtain a representation which is modified according to a perspective mode where the ratio of their height to their width is constant whatever their range, or to a normalized dimension mode where identical objects of the same orientation have the same representation whatever their range.

2 Claims, 13 Drawing Figures

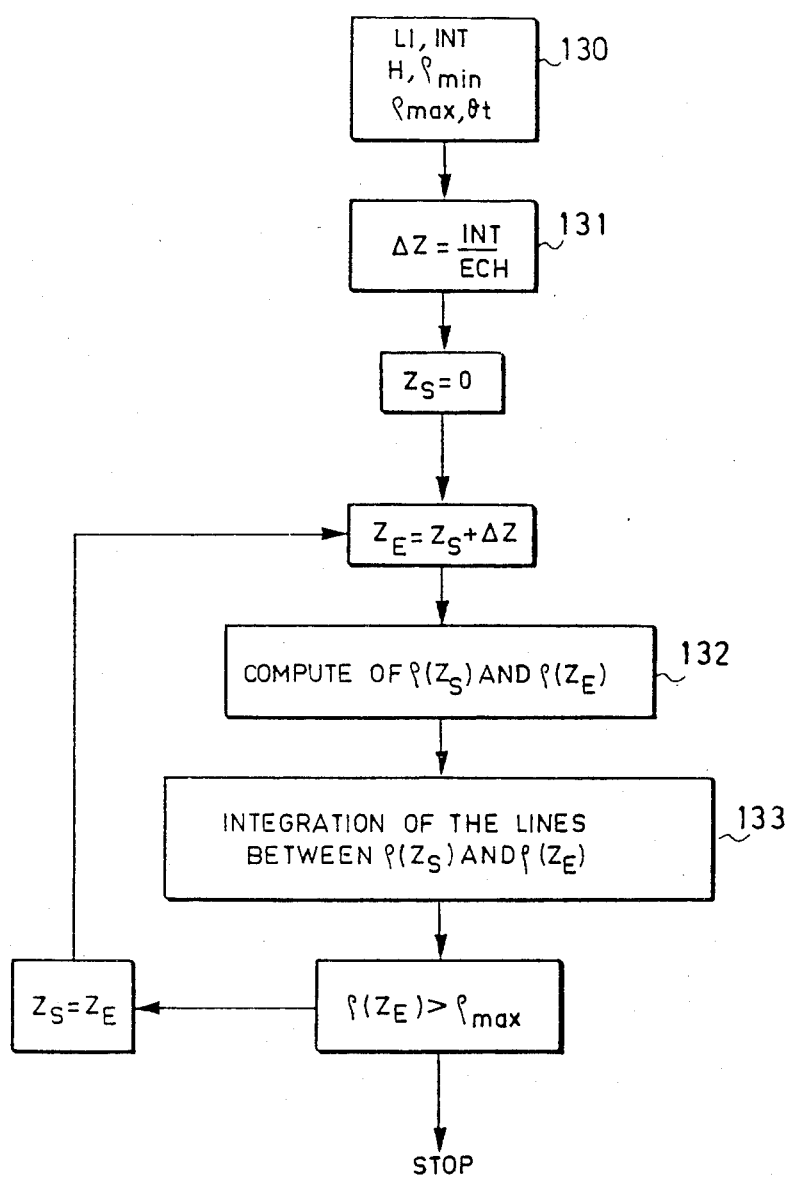

VISUAL DISPLAY PROCESS FOR SONARS

BACKGROUND OF THE INVENTION

The object of the present invention is a process for the visual display of channel signals supplied by a classification sonar from objects lying on the sea bed. This process make possible a presentation of the channel signals which makes it possible to produce an improved classification relative to the prior art.

A sonar of the classification type is designed for identifying and recognizing objects lying on the sea bed from the shape of the shadow they project. This type of sonar transmits acoustic wave pulses in directions which are inclined relative to the sea bed. On receipt, angular bearing channels are formed. The shadow effect of an object lying on the sea bed suppresses the echo signal coming from the bed. It is from this shadow that the shape and dimensions of the object are identified.

In the display devices of the prior art, presentation is made according to a nominally polar coordinate representation $\rho, \theta$ where $\rho$ is the range of the object and $\theta$ the bearing angle. The cathode ray tube scan along the horizontal axis is nominally proportional to $\theta$, and that along the vertical axis is nominally proportional to $\theta$.

This representation in $\rho, \theta$ is distorted relative to that which an observer placed at the sonar location would see, and this makes classification difficult.

SUMMARY OF THE INVENTION

The visual display process of the invention has the advantage, relative to the process of the prior art based on $\rho, \theta$ representation, of making possible a representation which is more familiar to the human eye.

The invention thus relates to a process for visually displaying objects lying at a depth H on the sea bed from the signals of a classification sonar, these signals giving the slant range $\rho$ from an object to the sonar and its bearing angle $\theta$, in which the visual display is provided by a cathode ray tube scan along a horizontal direction X, corresponding to $\theta$ and a vertical direction Y; the scan signals along X being of sawtooth shape of constant width and of constant amplitude $X_o$ giving a constant width of visual display defined by the minimum slant range $\rho_{min}$ and the scanning signals along Y being given by the relationship $$Y = kH \left[ 1 - \sqrt{\frac{\rho_{min}^2 - H^2}{\rho^2 - H^2}} \right]$$

where k is a constant of proportionality.

BRIEF DESCRIPTION OF THE DRAWINGS

Other characteristics and advantages will be evident from the description which follows illustrated by the Figures which represent:

FIG. 13, an example of the algorithm implemented in the invention.

DESCRIPTION OF THE PREFERRED EMBODIMENT

Figure 1:
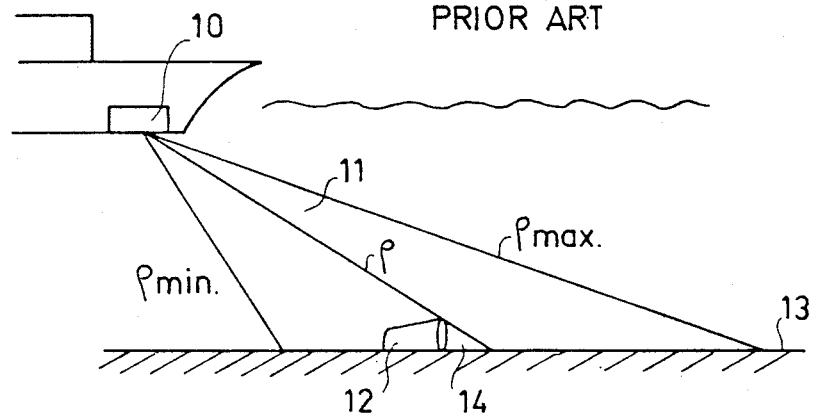
FIG. 1, an explanatory sketch of a classification sonar.

FIG. 1 represents schematically in the vertical plane the configuration of a classification sonar. Sonar 10 (which may be dipped or towed or installed in a surface vessel) contains, in a known manner, a transmitting antenna and a receiving antenna for transmitting and receiving acoustic waves along an inclined beam 11 bounded by the slant ranges $\rho_{min}$ and $\rho_{max}$. This beam is slightly inclined relative to the horizontal in such a way as to subject the sea bed 13 to sound waves at a glancing angle. Angular bearing channels are formed according to this inclination upon reception.

In the presence of an object 12 lying on the bed, the channel signals which correspond to the bearing of the object produce an echo signal followed by a shadow signal, or abbreviated shadow, defined by the range $\rho$, due to the fact that the signal echoed back by the part of the bed 14 hidden by the object is suppressed. In a classification sonar, this shadow is used to identify the objects.

It is known that the sonar transmits short pulses at successive instants $t_o$. To each transmission there correspond receptions at instants t which depend linearly on the slant range $\rho$ according to:

$$\rho = \frac{c(t - t_o)}{2}$$

where c is the speed of sound in water. If $\theta$ is the bearing angle which is given by the channel directions, the visual display of the channel signals is usually given in "$\rho, \theta$" form as shown in FIG. 2.

Figure 2:
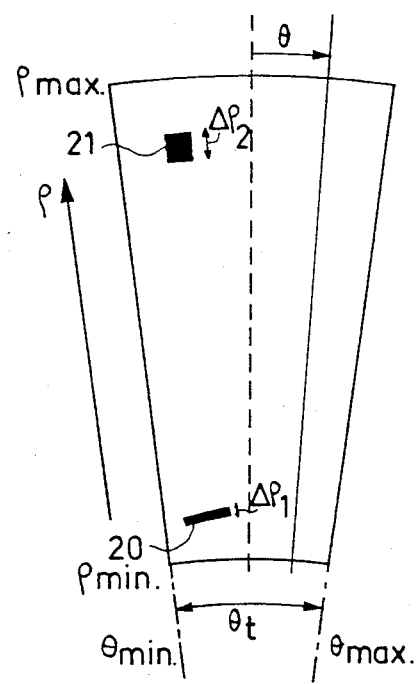
FIG. 2, the representation of objects by shadow, in polar coordinates $\rho, \theta$.

On FIG. 2, shadows 20 and 21 of two identical objects lying on the sea bed with the same bearing and at different ranges have been represented. The image dimensions correspond to the values of the slant ranges $\rho_{min}$ and $\rho_{max}$ and to bearing values $\rho_{min}$ and $\rho_{max}$. As shown in the Figure the heights of the objects on the screen $\Delta\rho_1$ and $\Delta\rho_2$ are appreciably different.

As the total bearing aperture:

$$\theta_t = \theta_{max} - \theta_{min}$$

is generally low, of the order of 10° approximately, the scrap is made in cartesian mode along axes X and Y.

Figure 3:
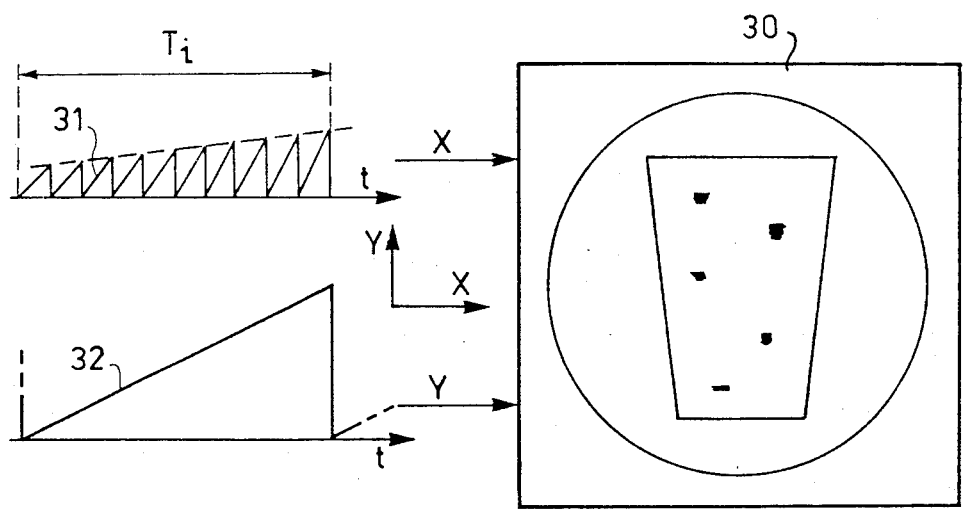
FIG. 3, a visual display screen with its scan signals.

The scan voltages applied, according to the prior art, to the X and Y plates of a cathode ray tube 30, used as the means of visual display, have been represented as a function of time t on FIG. 3. The X scan voltage, 31, has a sawtooth characteristic of constant period whose amplitude increases linearly, while the Y scan voltage, 32, has a linear characteristic throughout the scan time $T_i$. The peaks of the X scan sawtooth signals are proportional to $\rho$ and the Y scan is proportional to $\rho - \rho_{min}$.

Figure 4:
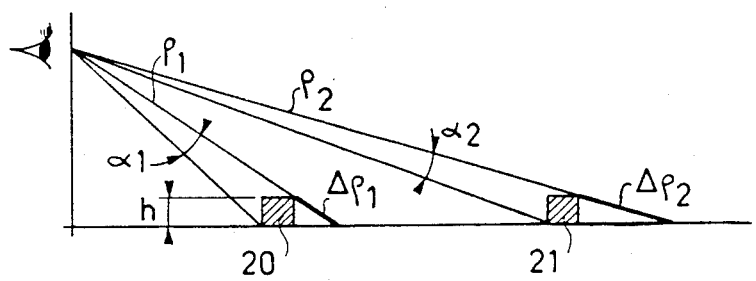
FIG. 4, an explanatory sketch for determining the dimension of the shadows according to the prior art.

FIG. 4 is an explanatory sketch of the determination of the shadow dimensions according to the prior art. This Figure represents two identical objects, 20 and 21, of height h and lying on the sea bed. An observer, depicted by an eye, sees the object 20 along the slant range $\rho_1$ and at the angle $\alpha_1$, and the object 21 along the slant range $\rho_2$ and at the angle $\alpha_2$. On the cathode ray screen, the heights of the shadows will be approximately proportional to $\Delta\rho_1$ and $\Delta\rho_2$. These heights, which are also visible on FIG. 2, increase with $\rho$ in such a way that the object farthest from the sonar appears larger on the screen than the closest object. This phenomenon is the opposite to the visual impression that an observer would have by looking at the sea bed from the boat.

The invention makes it possible to adapt the presentation of shadows to normal eyesight. It aims especially to overcome the disadvantage which has just been described. It makes possible two modes of presentation obtained by modification of the X and Y scan characteristics: the first mode is a perspective presentation of the sea bed which retains the height to width ratio of the shadows, the second mode is a presentation in normalized dimensions. For the second mode of presentation, identical objects are represented by shadows of the same dimensions.

Before describing the different possible embodiments of the system, the formulae for transposing from $\rho, \theta$ coordinate representation mode to the two other proposed modes will be given.

Figure 5:
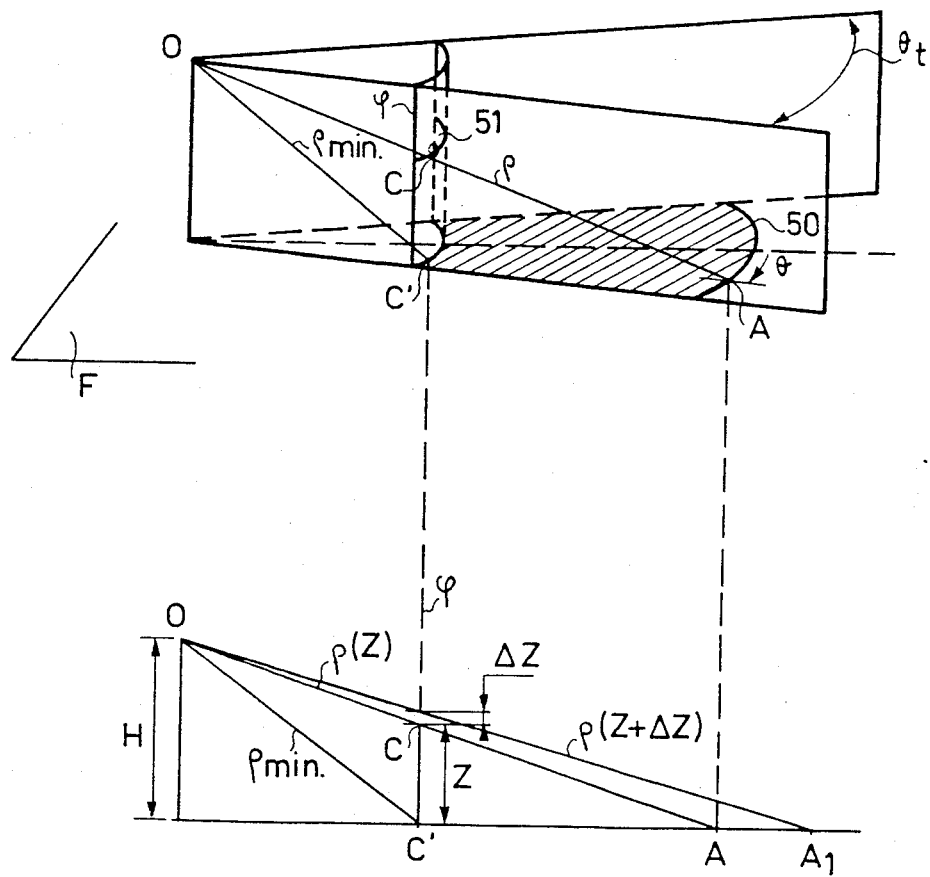
FIG. 5, sketches showing the principle of perspective representation.

On FIG. 5 have been represented, on the one hand the planes at bearings $-\theta_t/2$ and $+\theta_t/2$ passing through the center of antenna O and orthogonal to the plane F of the sea bed, and on the other hand a plane of bearing $\theta$. The origin of the angles is taken as the bisecting line of the angle formed by the bearing planes.

The transposition from $\rho, \theta$ mode to the first mode, called the perspective mode, is obtained by projecting a line of image points 50 situated at a range $\rho$ contained between the planes $-\theta_t/2$ and $+\theta_t/2$, onto a cylindrical surface $\rho$ orthogonal to the sea bed and situated at the minimum slant range $\rho_{min}$, which constitutes the reference range. The distance $CC'=Z$ measured on the cylinder corresponds to a point A situated at the range $\rho$. From simple geometric considerations and with reference to FIG. 5, we obtain:

$$Z = H\left(1 - \sqrt{\frac{\rho_{min}^2 - H^2}{\rho^2 - H^2}}\right) \quad (1)$$

H being the depth of the sea bed.

With the shadow of an object represented by $AA_1$, the ranges $\rho(Z)$ and $\rho(Z+\Delta Z)$ define the distance $\Delta Z$ measured on the surface $\phi$.

According to the invention, the Y scan in the perspective mode has a law $Y=k\cdot Z$, k being a coefficient of proportionality. Each image line 51 has a constant width so that the X scan is such that the maximum excursion remains constant at a value Xo. This representation retains the ratio of height to width of the shadows.

Figure 6:
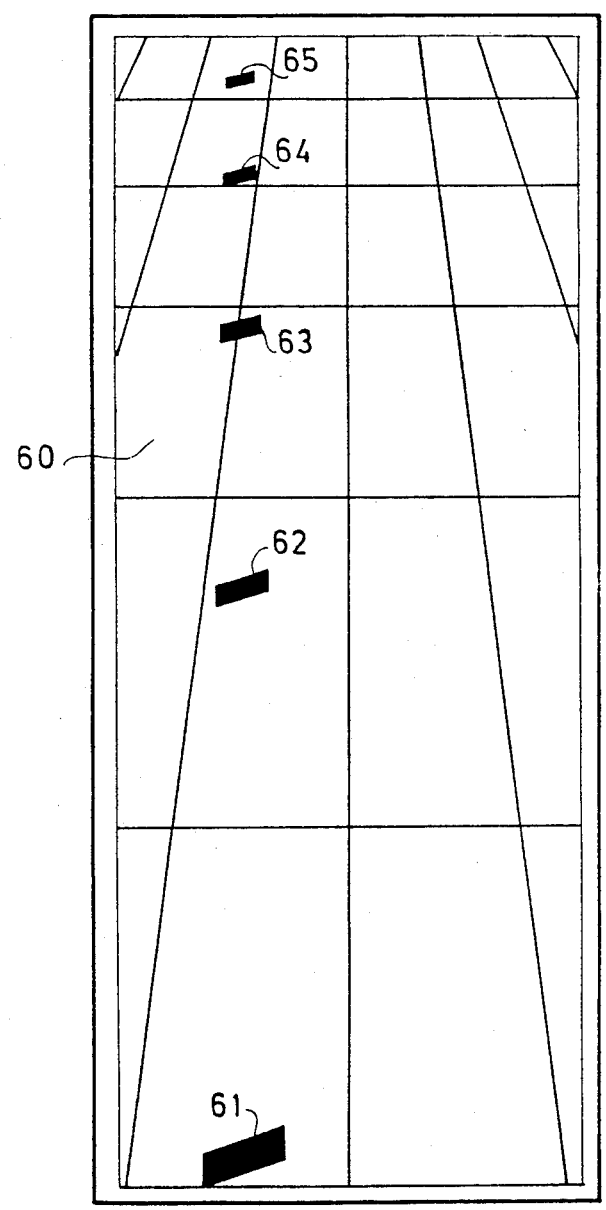
FIG. 6, a visual display of objects in perspective according to the invention.

FIG. 6 shows the representation obtained by this first perspective mode in the presence of several identical objects with the same orientation, placed at the same bearing and equidistant from each other. On screen 60, the perspective effect given by images 61, 62, 63, 64 and 65 of the above-mentioned objects can be seen.

The transposition from $\rho, \theta$ mode to the second mode of representation makes it possible to retain the dimension of the shadows whatever the range from the sonar to the various objects. For this the X scan produced for the preceding transposition is modified in such a way as to compensate for the shrinking effect due to the spacing between identical objects. The width of the image is therefore corrected, for each range, by the range projected onto the sea bed, that is $\sqrt{\rho^2 - H^2}$. The width of an image line for $Z=0$ being equal to $X_o$, the X scan of the invention is such that the maximum excursion has the law:

$$(X)_{max} = X_o \sqrt{\frac{\rho^2 - H^2}{\rho_{min}^2 - H^2}}$$

The corresponding Y scan is obtained by integration along Z of the coefficient of correction in X and we obtain the following law:

$$Y = \frac{1}{2} k H \mathrm{Log}\left(\frac{\rho^2 - H^2}{\rho_{min}^2 - H^2}\right).$$

Figure 7:
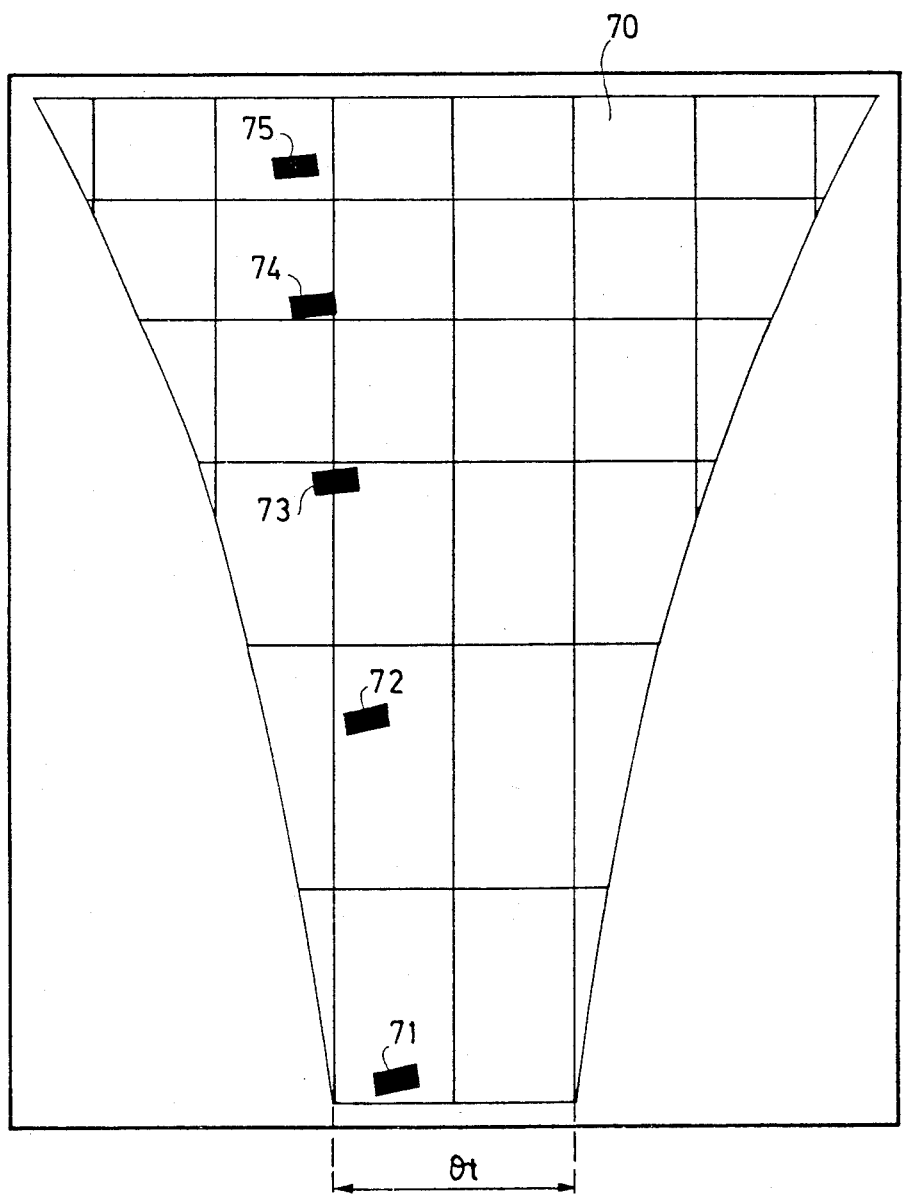
FIG. 7, a visual display of objects with normalized dimensions, according to the invention.

FIG. 7 shows the result of such a representation in which, for a same orientation, the dimensions of the objects represented do not vary as a function of range. On screen 70 it is seen that the marks 71, 72, 73, 74 and 75 corresponding to identical objects are also identical.

Figure 8:
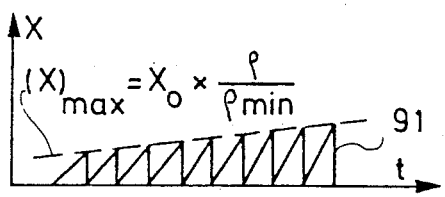
FIGS. 8, 9 and 10, diagrams representing different forms of scan laws.
Figure 8:
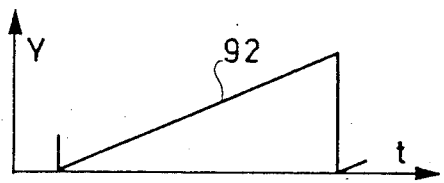
Figure 9:
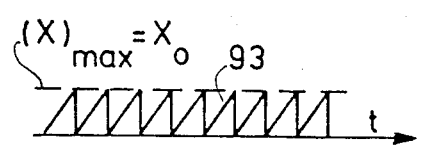
Figure 9:
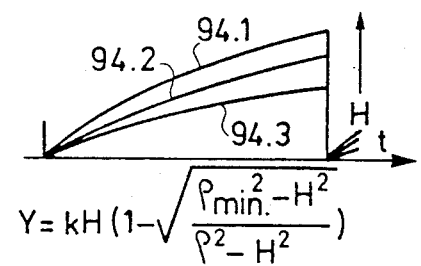
Figure 10:
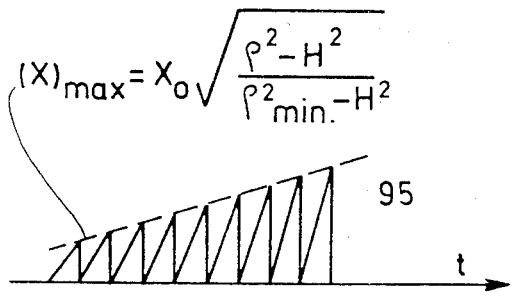
Figure 10:
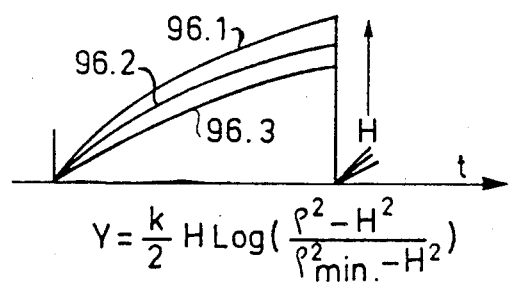

In its embodiment the visual display process of the invention makes it possible to choose between three modes of visual display: conventional, perspective, or normalized perspective. FIGS. 8, 9 and 10 represent, as a function of time, the shapes of the X and Y scan functions which make it possible to obtain one of the required three display modes.

FIG. 8 represents the functions of X and Y scan for the conventional representation mode. It can be seen that the peaks of the sawtooth signals $(X)_{max}$ of the X scan (curve 91) increase linearly with $\rho$. They are given by the relationship $$(X)_{max} = X_o \cdot \frac{\rho}{\rho_{min}}.$$

In the same way the Y scan increases linearly with $\rho$ (curve 92). The value of Y is given by the relationship $Y = k(\rho - \rho_{min})$.

FIG. 9 shows the perspective mode scan. The peaks of the sawtooth signals 93 for the X scan are constant. The scan along Y is proportional to Z. On the figure different signals 94.1, 94.2 and 94.3 have been shown, varying with depth H.

Finally, FIG. 10 shows the scans for the normalized dimensions mode. The peaks of the sawtooth signals 95 conform to the law referred to earlier in the same way as the Y scan law which has been represented for several values of depth, 96.1, 96.2 and 96.3.

Figure 11:
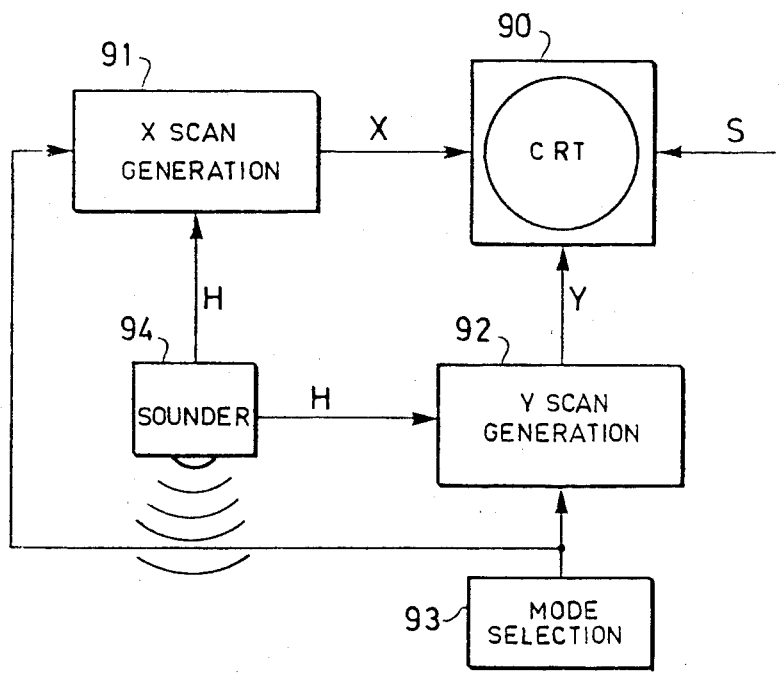
FIG. 11, an analog embodiment of the invention.

One embodiment of the process of the invention is represented on FIG. 11 by a block diagram. The cathode ray tube 90 receives, on the one hand, the video signal S from the channel signals, and on the other hand the X and Y scan control signals. These voltage control signals are produced by circuits 91 and 92 which generate the X and Y functions as represented on FIGS. 8, 9 and 10. Conventionally, the linear functions are provided by integration of square wave signals. The non-linear functions are produced by circuits of the known art, for example by diode networks. The scan circuits 91 and 92 may be digital computing circuits supplying the X and Y scan laws in the form of digital values converted into analog values at the input of the cathode ray tube. The choice of the X,Y pair is controlled by circuit 93. A non-represented clock provides the time base to circuits 91 and 92 which receive the depth H supplied to the process by a depth sounder 94.

While the height of the image along Y remains constant for the conventional $\rho$, $\theta$ representation, in the other two representations it varies with the depth of water H.

Figure 12:
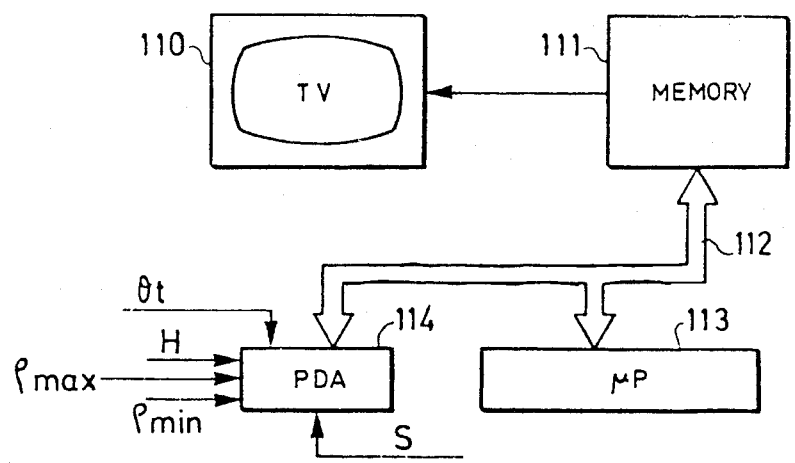
FIG. 12, a digital embodiment of the invention.

On FIG. 12 is shown a digital embodiment in which a television type receiver 110 is used receiving the video data from an image memory 111 according to a known technique. According to this technique, image points are stored in memory 111, taking the chosen representation into account. One television line corresponds to one line of image points of the memory. A bus 112 links memory 111 to a microprocessor circuit 113 and to an input-output interface circuit 114. Circuit 114 sends the sonar data, namely range $\rho_{max}$, minimum slant range $\rho_{min}$, the width of the angular sector $\theta_t$ and the depth of water H, to the microprocessor 113 in digital form. It also sends the video signal S produced with the N channel signals in digital form. This signal S is formed from a succession of video lines formed from N samples corresponding to the bearings $\theta_1$ to $\theta_N$, each line corresponding to a slant range $\rho$. In order to obtain one of the representations of the invention, it is necessary to integrate a given number of video lines, this number depending on the line row number.

FIG. 13 represents the simplified functional block diagram of the algorithm which is implemented in the microprocessor 113 to obtain the perspective representation. In addition to the "sonar" data H, $\rho_{min}$, $\rho_{max}$ and $\theta_t$, there is also, at stage 130, the width of the visually displayed image LI and the interval between lines INT. The scale factor ECH which is the ratio between the width LI and the width of the corresponding part of the sea bed, is computed thus:

$$ECH = \frac{LI}{\theta_t (\rho^2_{min} - H^2)^{\frac{1}{2}}}.$$

This factor makes it possible, at stage 131, to calculate the value of the computation step along the new vertical coordinate Z. The algorithm thus implements a loop in which the calculation of two values of $\rho$ corresponding to two successive image lines at stage 132 is made according to the relationship (1) which is inverted. These two values provide the number of video lines which must be integrated to give a single image line. The integration is obtained at stage 133 by summing the points corresponding to the same $\theta$; then normalization is effected by dividing by the number of points summed.

The image points thus integrated are then gathered in the image memory in order to be visually displayed. For example, in the perspective mode one video line is stored in one memory line at the bottom of the image (Z=0), ending up with 50 video lines in one memory line at the top of the image.

A new visual display system has been described for channel signals from a classification sonar of objects lying on the sea bed. It makes it possible to present the sea bed image according to several modes, the selection of mode being under the control of the operator. A more effective classification is obtained by means of modes of presentation which are more familiar to the human eye than the conventional $\rho$, $\theta$ representation which, however, remains one of the modes available.

I claim:

1. A process for visually displaying on a cathode ray tube objects at a depth H on the sea bed, the process comprising:

using a classification sonar for detecting the objects, each object having a slant range $\rho$ and a bearing angle $\theta$ to the sonar, the sonar producing video signals and a minimum slant range $\rho_{min}$ for each object;

using a sounder to determine the depth H;

first scanning the cathode ray tube along a horizontal direction X with a plurality of successive sawtooth-shaped scan signals of constant width and constant amplitude, the scan signals providing for a constant width of visual display defined by the minimum slant range $\rho_{min}$, the horizontal direction X representing the bearing angle $\theta$ of the object;

simultaneously second scanning the cathode ray tube along a vertical direction Y with the relationship $$Y = kH \left[ 1 - \sqrt{\frac{\rho^2_{min} - H^2}{\rho^2 - H^2}} \right]$$

where k is a constant of proportionality.

2. A process for visually displaying on a cathode ray tube objects at a depth H on the sea bed, the processing comprising:

using a classification sonar for detecting the objects, each object having a slant range $\rho$ and a bearing angle $\theta$ to the sonar, the sonar producing video signals and a minimum slant range $\rho_{min}$ for each object;

using a sounder to determine the depth H;

first scanning the cathode ray tube along a horizontal direction X with a plurality of successive sawtooth-shaped scan signals of constant width and maximum amplitude increasing according to the relationship $$(X)_{max} = X_0 \sqrt{\frac{\rho^2 - H^2}{\rho^2_{min} - H^2}}$$

where $X_0$ is a value defined by the minimum slant range $\rho_{min}$, the X direction representing the bearing angle $\theta$ of the object; and simultaneously second scanning the cathode ray tube along a vertical direction Y, representing the slant range $\rho$, according to the relationship $$Y = \frac{k}{2} H \log \left[ \frac{\rho^2 - H^2}{\rho^2_{min} - H^2} \right]$$

where k is a constant of proportionality.

* * * * *